(12) United States Patent
Gunia et al.

(10) Patent No.: US 9,037,348 B2
(45) Date of Patent: May 19, 2015

(54) LANE-KEEPING ASSISTANCE METHOD FOR A MOTOR VEHICLE

(71) Applicant: FORD GLOBAL TECHNOLOGIES, LLC, Dearborn, MI (US)

(72) Inventors: Dirk Gunia, Pulheim (DE); Jens Dornhege, Pulheim (DE); Torsten Wey, Moers (DE); Jan Meier, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 13/723,645

(22) Filed: Dec. 21, 2012

(65) Prior Publication Data
US 2013/0173115 A1   Jul. 4, 2013

(30) Foreign Application Priority Data
Jan. 2, 2012   (DE) .......................... 10 2012 200 009

(51) Int. Cl.
*A01B 69/00* (2006.01)
*B62D 6/00* (2006.01)
*B62D 15/02* (2006.01)

(52) U.S. Cl.
CPC  *B62D 6/00* (2013.01); *B62D 6/003* (2013.01); *B62D 15/025* (2013.01)

(58) Field of Classification Search
None
See application file for complete search history.

(56) References Cited

U.S. PATENT DOCUMENTS

| 2008/0091318 | A1  | 4/2008 | Deng et al. | |
| 2013/0173115 | A1* | 7/2013 | Gunia et al. | 701/41 |
| 2013/0190988 | A1* | 7/2013 | Limpibunterng et al. | 701/42 |
| 2014/0247180 | A1* | 9/2014 | Moriuchi et al. | 342/70 |

FOREIGN PATENT DOCUMENTS

| DE | 10312513 A1 | 9/2004 |
| DE | 102004047861 A1 | 4/2006 |

* cited by examiner

*Primary Examiner* — Thomas Tarcza
*Assistant Examiner* — Adam Alharbi
(74) *Attorney, Agent, or Firm* — Frank A. MacKenzie; Brooks Kushman P.C.

(57) ABSTRACT

A lane-keeping method and system for a motor vehicle determines a transverse deviation and an misalignment angle of the motor vehicle relative to a target lane centerline, calculates a reference track for the motor vehicle to follow to return to the centerline using the transverse deviation and the misalignment angle, determines a reference yaw rate using a curvature of the reference track and a longitudinal speed of the vehicle, and compares the reference yaw rate with an actual yaw rate of the vehicle to determine a control deviation. A steering input is then applied to a steering system of the motor vehicle to minimize the control deviation.

14 Claims, 3 Drawing Sheets

LANE-KEEPING ASSISTANCE METHOD FOR A MOTOR VEHICLE

CROSS-REFERENCE TO RELATED APPLICATIONS

This application claims foreign priority benefits under 35 U.S.C. §119(a)-(d) to DE 10 2012 200 009.7, filed Jan. 2, 2012, which is hereby incorporated by reference in its entirety.

TECHNICAL FIELD

The invention concerns a method for assisting the lane-keeping of a driver of a motor vehicle and a lane-keeping assistance system.

BACKGROUND

One main task in driving motor vehicles is to set a steering angle to follow a desired driving line which for example may be determined by a marked lane on a road. Departure from the present lane due to driver inattention is a frequent cause of accidents.

To increase the active safety of motor vehicles, therefore, devices are proposed which inform an inattentive driver of accidental lane departure. A greater gain in safety can be achieved however by a device in a motor vehicle which automatically resolves a current risk situation. One condition for this is that intervention can be made in the steering system of the motor vehicle such that the steering angle and vehicle reactions can be influenced or provoked automatically.

DE 10 2004 047 861 A1 discloses that on detection of lane departure and absence of driver activity, it is checked whether the driver is performing his steering task. Lane departure can be detected using imaging sensors which detect the lane course by pattern recognition of the lane boundaries. If no performance of the steering task is detected, an optical, acoustic or haptic warning is given to the driver. Alternatively or additionally to the warning, a corrective steering intervention can be initiated by application of a steering wheel torque.

US 2008/0091318 A1 discloses a system for lane-centering control in which guidance takes place along a target lane determined on the basis of information from a lane sensor. For this, on the basis of vehicle speed, yaw rate and steering angle, a processor calculates a predicted track and a control unit generates a control signal and triggers a front wheel steering actuator to reduce a difference between the predicted track and the target lane.

Said prior art provides no control along a predefinable track for optimum return of the motor vehicle to the lane centre.

According to DE 103 12 513 A1 the position of a vehicle relative to the lane is determined using a position detection device and forms the basis for determining the nominal steering angle in a lane controller, from which a nominal steering moment is determined which is overlaid over the steering moment generated by the driver. The signals from the position detection device, data from the nominal lane emitter on the lateral nominal offset to be observed relative to the roadway, and signals from a vehicle state detection sensor are supplied to the lane controller in which a lane control algorithm is stored which is not described in more detail.

The known solutions do not always produce an optimum behavior of the vehicle in the respective situation. Thus for example reactions for straight-ahead driving and cornering can differ substantially.

The object of the present invention is to specify a method for assisting the lane-keeping of a driver of a motor vehicle and a lane-keeping assistance system, wherein the above disadvantages are avoided and wherein in particular the driver support and the driving behavior of the motor vehicle are improved.

SUMMARY

In one disclosed embodiment, a lane-keeping method for a motor vehicle comprises determining a transverse deviation and an misalignment angle of the motor vehicle relative to a target lane centerline, calculating a reference track for the motor vehicle to follow to return to the centerline using the transverse deviation and the misalignment angle, determining a reference yaw rate using a curvature of the reference track and a longitudinal speed of the vehicle, and comparing the reference yaw rate with an actual yaw rate of the vehicle to determine a control deviation. A steering input is then applied to a steering system of the motor vehicle to minimize the control deviation.

In another disclosed embodiment, the reference track is calculated such that at least one of an instantaneous curvature of the reference track and a curvature change rate of the reference track do not each exceed a pre-defined maximum value.

In another disclosed embodiment, the target lane centerline has a curvature and the steering input is controlled based upon the curvature of the target lane centerline.

In another disclosed embodiment, the steering input is only applied if the motor vehicle enters (or is about to enter) an intervention zone. The intervention zone geometry is dependent on at least one of: a lane width, a lane-related transverse speed of the motor vehicle, the longitudinal speed, a curvature of the target lane centerline, and the direction of a deviation from the target lane centerline.

In another disclosed embodiment, a lane-keeping assistance system for a motor vehicle comprises a lane detection sensor determining a transverse deviation and an misalignment angle of the motor vehicle relative to a target lane centerline, a speed sensor generating a signal indicating a longitudinal speed of the vehicle, a yaw rate sensor generating a signal indicating an actual yaw rate of the vehicle, and a controller operative to: (a) calculate a reference track for the motor vehicle to follow to return to the centerline using the transverse deviation and the misalignment angle, (b) determine a reference yaw rate using a curvature of the reference track and the longitudinal speed signal, and (c) compare the reference yaw rate with the actual yaw rate signal to determine a control deviation. The controller commands a steering actuator to apply a steering input into a steering system of the motor vehicle to minimize the control deviation.

BRIEF DESCRIPTION OF THE DRAWINGS

The invention is now explained below as an example with reference to the drawings. These show the following.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
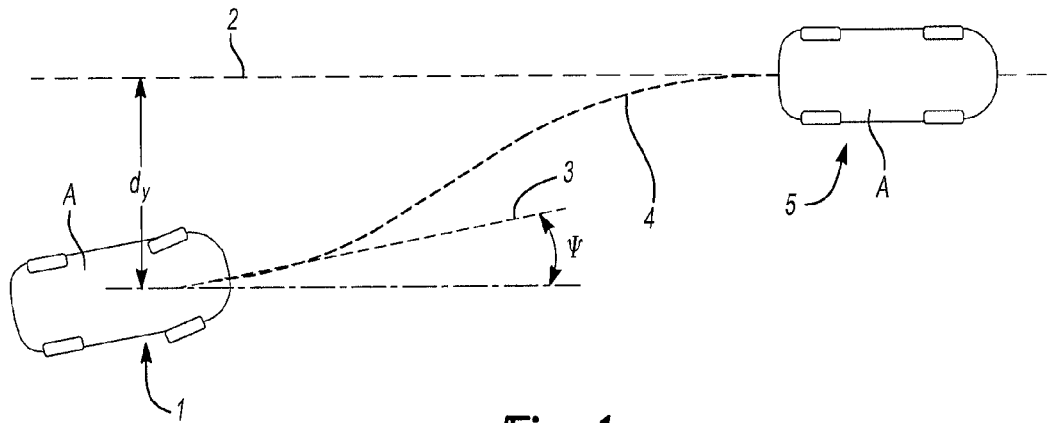
FIG. 1 is an example of a driving situation in top view.

As shown as an example in FIG. 1, a vehicle A indicated symbolically in a starting position 1 is spaced or offset from a target lane centerline 2 by a transverse deviation $d_y$, and a forward direction 3 of the motor vehicle A encloses with the target lane centerline 2 a misalignment angle $\psi$. The transverse deviation $d_y$ and the angle $\psi$ are determined by a position detection system. For this, suitable lane detection methods and apparatus, in particular optical methods for detection of lane marking, are known in the art. Here, for example, one or more forward-facing cameras with corresponding image processing or a downward-facing sensor detect markings of the present lane of the motor vehicle and determine the position, in particular the transverse deviation, and the misalignment angle of the motor vehicle relative to the markings.

A nominal or reference track 4 is calculated to return the motor vehicle A to target lane centerline 2, that is, to move the vehicle from the starting position 1 to the target position 5, at which the vehicle is following the target lane centerline 2. The reference track 4 typically has a curvature (the "S" shape seen in FIG. 1, for example) to compensate for deviation from the target lane centerline after a specific distance. The reference track 4 is calculated using the transverse deviation $d_y$ and angle $\psi$ and takes into account requirements of driving dynamics, safety and comfort. The reference track is in particular determined to allow rapid exit from a possible danger zone and to reach the target lane centerline 2 in an optimum manner with regard to safety and comfort. The target lane centerline 2 may, for example, be the center of the lane detected by the lane marking detection.

A reference yaw rate required to follow the reference track 4 is determined at each point along the track from the curvature of the track at that point and an actual longitudinal speed of the motor vehicle. The actual longitudinal speed may be determined, for example, by a sensor (speedometer, accelerometer/inertial measurement unit, or GPS, for example) or may be available from an information system of the motor vehicle, for example a vehicle bus, for use in other systems.

At each point along reference track 4 an actual yaw rate of the motor vehicle A is determined or measured. The actual yaw rate may be detected by a sensor (accelerometer/inertial measurement unit or GPS, for example) or may be available from an information system of the motor vehicle, as is well known in the vehicle stability art.

The difference between the reference and actual yaw rates is used within a control circuit to minimize a deviation of the motor vehicle A from the reference track 4, in order to achieve an improved driving behavior on the return to the target lane centerline 2. A control deviation is determined or a corresponding control deviation is produced in a control circuit.

A steering input is introduced into the steering system of the motor vehicle A to minimize the control deviation. As used herein, steering input is defined as being calculated and applied as either a force or a moment, depending on the design of the steering system and/or actuators. The steering input determined to minimize the control deviation thus works in addition to any steering inputs made by the driver. The disclosed method is suitable in particular for motor vehicles with controllable steering support.

Because a control deviation is determined by comparison of the reference yaw rate with the actual yaw rate and then minimized, in many driving situations and in particular independently of the tire slip of the vehicle in relation to the roadway (caused inter alia by the road surface conditions), an optimum return to a desired target lane centerline can be achieved. In contrast, automatic control via the steering angle in a vehicle with tire slip would only partly lead to the desired vehicle reaction since, because road surface conditions ($\mu$) may not be constant, for one driving situation different slip angles can occur between tires and road so that an unknown deviation between the reference track and the actual track of the motor vehicle would remain.

The present method is based on the knowledge that in many driving situations, even for a vehicle with tire slip, a quasi-static vehicle behavior can be assumed, wherein there is a fixed mathematical relationship between the vehicle speed, the reference track curvature and the yaw rate of the vehicle. Thus the curve radius can be determined directly from the vehicle yaw rate. According to the disclosed method, therefore, the reference yaw rate calculated from the reference track is compared with the actual yaw rate measured in the vehicle and forms the basis for the control. The assumption of quasi-static conditions thus allows the control circuit to draw conclusions on the yaw rate for return to the target lane centerline. Thus the vehicle can be reliably steered back into its lane and oriented parallel to the existing markings.

Furthermore, because a steering input force and/or moment is introduced, in comparison with overlaying an additional steering angle to the steering angle set by the driver, a more effective and safer support for the driver is possible.

In particular also only a finite fraction of the total reference track for return to the target lane centerline may be calculated in advance.

FIG. 1 shows target lane centerline 2 as being straight, but in a more general case the lane centerline may be curved. In this case, a curvature of the lane centerline or road may be determined and the reference track may be calculated to return the motor vehicle to the curved target track lane according to the curvature of the lane ahead. In particular, the curvature of the detected lane can be overlaid over the calculated reference track. This allows a particularly precise, safe and comfortable return of the motor vehicle to the desired lane even in the case that the lane is curved.

In one embodiment of the method, the determined/known curvature of the lane may be used to pre-control the steering input force and/or moment applied. In particular, with the present actual longitudinal speed of the vehicle and with a determined/known road curvature, a corresponding transverse acceleration of the vehicle can be calculated. From this, for example, for a given weight distribution in the vehicle, a transverse force on a steerable front axle can be determined directly. If relatively small amounts of lane curvature (large curve radius) are assumed, a linear translation of the steering geometry can be assumed, wherein the rack force and/or the corresponding steering moment required for pre-control according to the road curvature to be introduced rises linearly with the curvature and quadratically with the vehicle speed. The steering force/moment determined from actual yaw rate and reference yaw rate to minimize the control deviation may then be overlaid with the steering force/moment obtained from the curvature pre-control. For intervention in the steering system, the resulting total steering input or a correspondingly determined total steering input is supplied to the steering system, for which an overlay interface can be provided. Said total steering input force/moment thus acts in addition to the steering force/moment generated by the driver. Thus a particularly precise, safe and comfortable return of the motor vehicle to the target lane centerline of a curved lane can be achieved.

It may further be advantageous to overlay the steering input determined from the actual yaw rate and reference yaw rate to minimize the control deviation with a friction-compensating force to compensate for steering friction and/or a damping force to damp rapid steering interventions not caused by the driver. Such additional steering friction or interventions may be attributable, for example, to the control process described or other influences. The corresponding total steering input is introduced into the system and acts additionally to the steering force/moment generated by the driver. Thus the quality of the steering intervention is further increased with regard to safety and comfort.

The reference track 4 may be calculated such that the instantaneous curvature of the reference track (the curvature at any single point) and/or a change rate (over time and/or distance) of the curvature experienced by the motor vehicle as it travels along the reference track, do not exceed a predefined maximum value for each. Thus it can be guaranteed with greater safety that steering interventions can be controlled at all times and have no substantial adverse effect on driving comfort.

It may be advantageous for the transverse deviation and the misalignment angle of the motor vehicle to be weighted independently of each other in the calculation of the reference track. The weightings may be independent of the longitudinal speed of the motor vehicle. Thus a further improvement in safety and driving comfort throughout a wide range of different driving situations can be achieved.

It is possible that a continuous steering intervention of the nature described may lead to an unusual steering feedback. Therefore, these interventions may be activated only when there is an impending danger of lane departure. In particular, the steering inputs (determined from the actual yaw rate and reference yaw rate to minimize the control deviation and, where applicable, the above-mentioned amounts of the total steering force) may be applied only when the vehicle enters an intervention zone. For this, inside and/or outside lane markings, one or more intervention zones can be defined, entering which activates the method described above, or wherein an intervention in the steering takes place only on entering an intervention zone.

In particular the geometry (arrangement and/or size) of an intervention zone may depend on a determined width of the present lane, a lane-related transverse speed of the motor vehicle, the longitudinal speed of the motor vehicle and/or the curvature of the target lane centerline or a curve radius of the lane. The geometry of the intervention zones, for example the distance of an intervention zone from a target lane centerline or from a detected lane boundary, may also be dependent on the direction of deviation of the motor vehicle from the target lane centerline so that, viewed in the driving direction, an intervention zone on the left side of the lane can have a different size and/or be arranged at a different distance from the lane center than an intervention zone on the right side.

Figure 2:
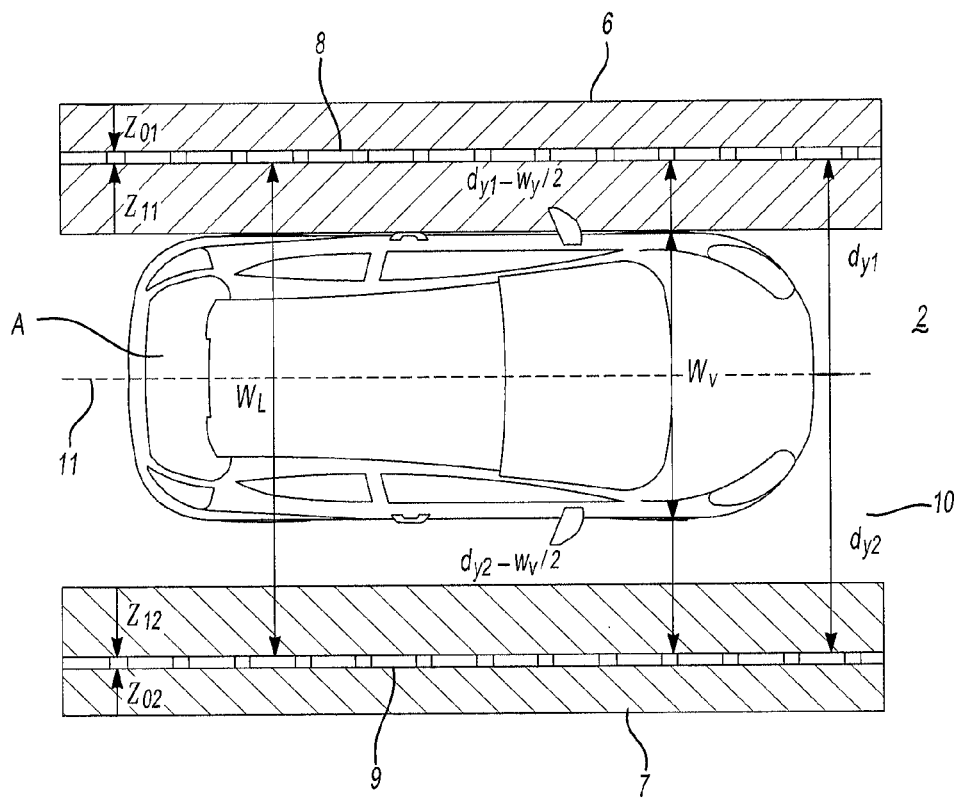
FIG. 2 is an exemplary intervention zones in top view.

According to FIG. 2, a left intervention zone 6 and a right intervention zone 7 can be defined which are determined by the left marking 8 and right marking 9 respectively of the present lane 10 of the motor vehicle A, which markings for example can be guide or boundary lines. The intervention zones 6, 7, relative to the respective markings 8, 9, each comprise an inner region with width $z_{i1}$ and $z_{i2}$ and an outer region with width $z_{o1}$ and $z_{o2}$. The lane 10 has a width $W_L$, and motor vehicle A has a width $W_V$.

A position detection system (not shown) can, for example, determine a transverse deviation of motor vehicle A from the center of the lane 10 and from this the left distance $d_{y1}$ and right distance $d_{y2}$ of a center axis 11 of the motor vehicle A from the markings 8, 9. An activation of the method described herein for assisting lane-keeping can, for example, take place when the motor vehicle A enters the left intervention zone 6, i.e. when:

$$d_{y1} - W_V/2 < z_{i1}$$

or when the motor vehicle enters the right intervention zone 7, i.e.:

$$d_{y2} - W_V/2 < z_{i2}$$

To activate the method described herein for assisting lane-keeping of the motor vehicle A, furthermore the misalignment angle of the motor vehicle A relative to the lane 10 or the markings 8, 9 can be used (not shown in FIG. 2).

Figure 3:
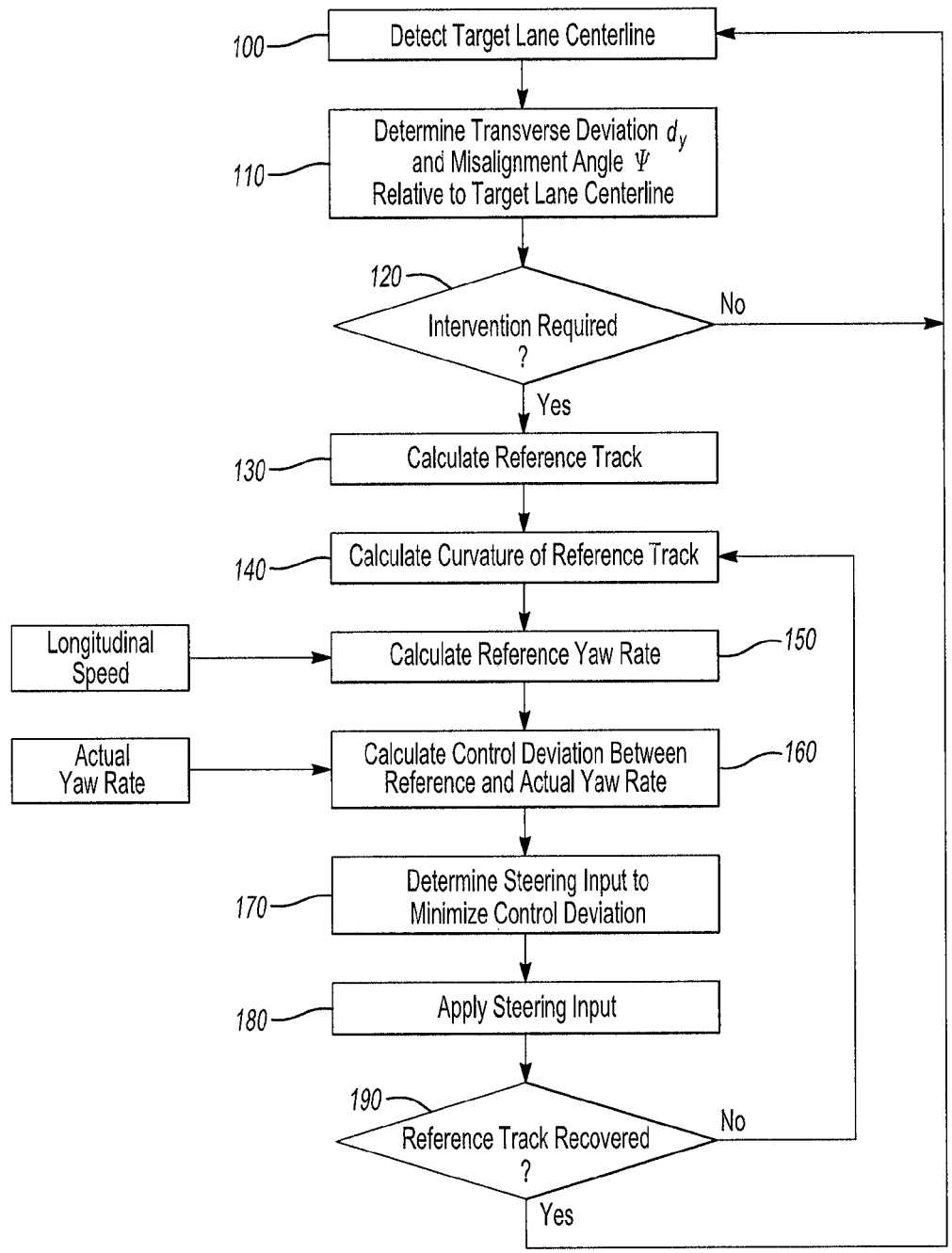
FIG. 3 is a simplified flow diagram of a method according to the invention.

FIG. 3 shows a method of lane-keeping in simplified flow-chart form. A lane detection system is operated (block 100) and information derived therefrom is used to determine a transverse deviation $d_y$ and an misalignment angle angle $\psi$ of the motor vehicle relative to the lane (block 110). If conditions exist that require an intervention (block 120, "YES"), from data supplied by the position detection system a reference track is calculated to return the motor vehicle to a target track lane (block 130), as well as a present curvature of the reference track (block 140).

Using the actual vehicle speed provided by the vehicle bus, a reference yaw rate is determined (block 150). Using an actual yaw rate supplied by the vehicle bus, the difference between the reference and actual yaw rates is determined which serves as a control deviation in the control circuit to minimize the deviations from the reference track (block 160). A steering force is determined to minimize the control deviation (block 170) and applied to the steering system of the motor vehicle (block 180).

In a cycle predefined by the design of the sensors and the control circuit, then the present curvature of the reference track corresponding to the present location of the motor vehicle is again determined and the further steps of the method are repeated. It can also be provided that within the control circuit the transverse deviation and misalignment angle are again determined and where applicable the reference track recalculated each time (not shown). After covering the entire reference track or when the deviation $d_y$ of the motor vehicle and misalignment angle angle $\psi$ fall below minimum values, the method is ended and lane detection, determination of the transverse deviation $d_y$ and the misalignment angle angle $\psi$, and monitoring of an intervention condition are performed again.

Figure 4:
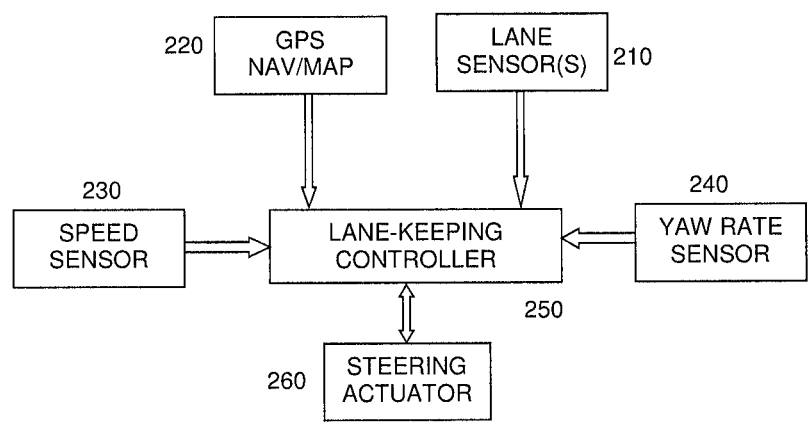
FIG. 4 is a schematic block diagram of a system for implementing the method.

Referring now to FIG. 4, a lane-keeping assistance system for implementing lane-keeping assistance as described above may comprise a vehicle position detection device to determine a transverse deviation and a misalignment angle of the motor vehicle relative to a present lane of the motor vehicle. Such a position detection device can, for example, comprise one or more lane sensors 210, such as cameras with corresponding image processing to detect lane markings, and/or a downwardly-directed sensor arrangement arranged on the vehicle underbody for detecting the markings of the present lane. A GPS navigation device 220 may further be used to provide positioning information, as is well-known in the art.

Furthermore, the lane-keeping assistance system may comprise sensors detecting and generating outputs related to a longitudinal speed (230) and an actual yaw rate (240) of the motor vehicle. Such outputs may, for example, be available in an information system of the motor vehicle, for example in the vehicle bus. The lane-keeping assistance system can additionally or instead also comprise sensor devices to determine the longitudinal speed and actual yaw rate.

Furthermore, the lane-keeping assistance system may comprise a controller or processor device 250 operative to calculate a reference track to return the motor vehicle to a target lane centerline of the lane, to determine a reference yaw rate from a curvature of the reference track and the actual longitudinal speed of the motor vehicle, to generate a control deviation by comparison of the reference yaw rate with the actual yaw rate, to determine a steering force to minimize the control deviation, and to control an actuator 260 or other device for introduction of the steering force into the motor vehicle steering system. The lane-keeping assistance system can also be designed to cooperate with actuators of a controllable steering support device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lane-keeping method for a motor vehicle comprising:
    determining a transverse deviation and an misalignment angle of the motor vehicle relative to a target lane centerline;
    calculating a reference track for the motor vehicle to follow to return to the centerline using the transverse deviation and the misalignment angle;
    determining a reference yaw rate using a curvature of the reference track and a longitudinal speed of the vehicle;
    comparing the reference yaw rate with an actual yaw rate of the vehicle to determine a control deviation;
    applying a steering input into a steering system of the motor vehicle to minimize the control deviation; and
    wherein the transverse deviation and the misalignment angle of the motor vehicle are weighted independently of each other in the calculation of the reference track, and wherein the respective weightings are independent of the longitudinal speed.

2. The method of claim 1, wherein the reference track is calculated such that at least one of an instantaneous curvature of the reference track and a curvature change rate of the reference track do not each exceed a pre-defined maximum value.

3. The method of claim 1, wherein the target lane centerline has a curvature and the steering input is controlled based upon the curvature of the target lane centerline.

4. The method of claim 1, wherein the steering input is overlaid with a friction-compensating force to compensate for steering friction.

5. The method of claim 1, wherein the steering input is overlaid with a damping force to damp rapid steering interventions not made by a driver of the vehicle.

6. The method of claim 1, wherein the steering input is only applied on entering an intervention zone.

7. The method of claim 6, wherein a geometry of the intervention zone is dependent on at least one of: a lane width, a lane-related transverse speed of the motor vehicle, the longitudinal speed, a curvature of the target lane centerline, and a direction of deviation from the target lane centerline.

8. The method of claim 1, wherein a finite fraction of the reference is calculated in advance.

9. A lane-keeping method for a motor vehicle comprising:
    determining a transverse deviation and an misalignment angle of the motor vehicle relative to a target lane centerline;
    calculating a reference track for the motor vehicle to follow to return to the centerline using the transverse deviation and the misalignment angle, the reference track being calculated such that at least one of an instantaneous curvature of the reference track and a curvature change rate of the reference track do not each exceed a pre-defined maximum value;
    determining a reference yaw rate using a curvature of the reference track and a longitudinal speed of the vehicle;
    comparing the reference yaw rate with an actual yaw rate of the vehicle to determine a control deviation;
    determining a position of the motor vehicle relative to an intervention zone defined with reference to at least one of: a lane width, a lane-related transverse speed of the motor vehicle, the longitudinal speed, a curvature of the target lane centerline, and a direction of deviation from the target lane centerline
    if and only if the vehicle is within the intervention zone, applying a steering input into a steering system of the motor vehicle to minimize the control deviation; and
    wherein the transverse deviation and the misalignment angle of the motor vehicle are weighted independently of each other in the calculation of the reference track, and wherein the respective weightings are independent of the longitudinal speed.

10. The method of claim 9, wherein the target lane centerline has a curvature and the steering input is controlled based upon the curvature of the target lane centerline.

11. The method of claim 9, wherein the steering input is overlaid with a friction-compensating force to compensate for steering friction.

12. The method of claim 9, wherein the steering input is overlaid with a damping force to damp rapid steering interventions not made by a driver of the vehicle.

13. The method of claim 9, wherein a finite fraction of the total reference track for return to the target lane centerline is calculated in advance.

14. A lane-keeping assistance system for a motor vehicle comprising:
    a lane detection sensor determining a transverse deviation and an misalignment angle of the motor vehicle relative to a target lane centerline;
    a speed sensor generating a signal indicating a longitudinal speed of the vehicle;
    a yaw rate sensor generating a signal indicating an actual yaw rate of the vehicle;
    a controller operative to:
    (a) calculate a reference track for the motor vehicle to follow to return to the centerline using the transverse deviation and the misalignment angle,
    (b) determine a reference yaw rate using a curvature of the reference track and the longitudinal speed signal, and
    (c) compare the reference yaw rate with the actual yaw rate signal to determine a control deviation; and
    a steering actuator commanded by the controller to apply a steering input into a steering system of the motor vehicle to minimize the control deviation,
    (d) determine a position of the motor vehicle relative to an intervention zone defined with reference to at least one of: a lane width, a lane-related transverse speed of the motor vehicle, the longitudinal speed, a curvature of the target lane centerline, and a direction of deviation from the target lane centerline; and command the steering actuator to apply the steering input if and only if the vehicle is within the intervention zone.

* * * * *